United States Patent
Winter

(10) Patent No.: US 9,921,060 B2
(45) Date of Patent: Mar. 20, 2018

(54) TARGET OBJECT FOR A LASER MEASURING DEVICE AND METHOD FOR IDENTIFYING THE TARGET OBJECT

(71) Applicant: Hilti Aktiengesellschaft, Schaan (LI)

(72) Inventor: Andreas Winter, Feldkirch (AT)

(73) Assignee: Hilti Aktiengesellschaft, Schann (LI)

( * ) Notice: Subject to any disclaimer, the term of this patent is extended or adjusted under 35 U.S.C. 154(b) by 0 days.

(21) Appl. No.: 14/646,948

(22) PCT Filed: Nov. 26, 2013

(86) PCT No.: PCT/EP2013/074705
§ 371 (c)(1),
(2) Date: May 22, 2015

(87) PCT Pub. No.: WO2014/082987
PCT Pub. Date: Jun. 5, 2014

(65) Prior Publication Data
US 2015/0316375 A1 Nov. 5, 2015

(30) Foreign Application Priority Data
Nov. 28, 2012 (DE) ........................ 10 2012 221 760

(51) Int. Cl.
*G01C 3/08* (2006.01)
*G01C 15/00* (2006.01)

(52) U.S. Cl.
CPC ......... *G01C 15/002* (2013.01); *G01C 15/006* (2013.01)

(58) Field of Classification Search
CPC ........................... G01C 15/002; G01C 15/006
See application file for complete search history.

(56) References Cited

U.S. PATENT DOCUMENTS

| | | | |
|---|---|---|---|
| 6,384,907 | B1 | 5/2002 | Gooch |
| 7,515,256 | B2 | 4/2009 | Ohtomo et al. |
| 7,861,423 | B2 | 1/2011 | Kumagai et al. |
| 8,218,857 | B2 | 7/2012 | Moriyama |

(Continued)

FOREIGN PATENT DOCUMENTS

| | | |
|---|---|---|
| DE | 102009014782 | 9/2010 |
| DE | 102010024014 | 12/2011 |

(Continued)

*Primary Examiner* — Samantha K Abraham
(74) *Attorney, Agent, or Firm* — Davidson, Davidson & Kappel, LLC

(57) ABSTRACT

A target object (20) for a laser measuring device (11) emitting a search beam and a measurement beam, including a reflector device (21) having at least one reflector element (22) for reflecting the measurement beam, a receiving device (23) having at least one receiving element (24) for receiving the search beam, a transmitting device (25) having at least one transmitting element (31, 32, 33) for emitting a visible transmission beam (34, 35, 36) and a control device (26) having an evaluation element (27) for evaluating the received search beam and a control element (28) for controlling the receiving and transmitting devices (23, 25) is provided. The transmitting device (25) emits a first and a second visible transmission beam (34, 35), wherein the color of light of the first visible transmission beam (34) differs from the color of light of the second visible transmission beam (35).

12 Claims, 3 Drawing Sheets

(56) References Cited

U.S. PATENT DOCUMENTS

| | | |
|---|---|---|
| 2008/0229592 A1 | 9/2008 | Hinderling et al. |
| 2011/0260033 A1 | 10/2011 | Steffensen et al. |
| 2012/0008136 A1 | 1/2012 | Jaeger et al. |
| 2012/0124850 A1* | 5/2012 | Ortleb .................. G01C 15/06 33/228 |

FOREIGN PATENT DOCUMENTS

| | | |
|---|---|---|
| EP | 1734336 | 12/2006 |
| EP | 2103905 | 9/2009 |
| EP | 2226610 | 9/2010 |
| JP | 2004138530 A | 5/2004 |
| WO | WO01/04575 | 1/2001 |
| WO | WO2008/145156 | 12/2008 |
| WO | WO2010/100043 | 9/2010 |

* cited by examiner

TARGET OBJECT FOR A LASER MEASURING DEVICE AND METHOD FOR IDENTIFYING THE TARGET OBJECT

The present invention relates to a target object for a laser measuring device as well as a method for identifying the target object with the aid of the laser measuring device.

BACKGROUND

Laser measuring devices are used for measuring target points which determine distances and directions (angles) of the target points. Laser measuring devices are known which are designed as a theodolite, a total station, a dumpy level, or a laser scanner. The laser measuring devices include a distance measuring device for measuring the distance between the target point and the distance measuring device and an angle measuring device for measuring angles. The measurement of the target points is supported by target objects which are placed at the target points. The target objects are used in surveying systems including laser measuring devices which transmit a search beam and a measuring beam, the wavelengths for the search beam and the measuring beam being advantageously different. The measuring beam is used for the measuring task of the laser measuring device, e.g., for measuring the distance and/or the angle, and the search beam is used to find and identify the target objects. Due to the different tasks of the search beam and the measuring beam, the search beam is strongly expanded for the purpose of detecting a larger spatial area, whereas a focused measuring beam is used for the measuring task. The target objects are subdivided into passive target objects which reflect the search beam of the laser measuring device and active target objects which do not reflect the search beam, but transmit a transmission beam. Active target objects have the advantage that the laser measuring device is able to distinguish the transmission beam, due to a different wavelength, from the beams which are reflected from reflective surfaces.

EP 1 734 336 A1 provides an active target object for a laser measuring device which transmits an infrared search beam and a measuring beam. The target object includes a reflector including at least one reflector element for reflecting the measuring beam, a receiver including a receiver element for receiving the infrared search beam, a transmitter including a transmitter element for transmitting a visible or an infrared search beam as well as a control device including an evaluation element for evaluating the received search beam and a control element for controlling the transceiver devices. The target objects have the disadvantage that it is not possible to identify and to differentiate between the target objects. The visible or infrared transmission beams have the same wavelength for several target objects in a surveying system.

A method for identifying a target object with the aid of a laser measuring device as well as a corresponding surveying system including a laser measuring device and multiple identifiable target objects are known from DE 10 2010 024 014 A1. The laser measuring device includes a laser measuring unit which transmits a measuring beam and which is designed for measuring a distance and/or an angle, for example, a camera unit as a detection device for detecting the target objects and a control device including a control element for controlling the laser measuring unit and the camera unit. The target object includes a reflector including at least one reflector element for reflecting the measuring beam, a transmitter including at least one transmitter element for transmitting a visible transmission beam, which is used to identify the target object, and a control device including a control element for controlling the transmitter. The identification of the target objects takes place with the aid of the visible transmission beam which is used to identify the target objects and which is adjustable between a first and a second optical state. In the case of the first and the second optical states of the visible transmission beam, different wavelengths or polarization states may be involved, for example. As a further possibility to implement two different optical states, it is provided to switch on (first optical state) and to switch off (second optical state) the visible transmission beam. The laser measuring device is connected or at least designed to be connectable to the target objects of the surveying system via communication links. To establish the communication links, corresponding transceiver elements are provided in the laser measuring device and in the target objects.

The known method for identifying the target objects includes the following method steps: The control device of the target object transmits a control instruction to the transmitter which transmits a visible transmission beam in a first optical state as a result of the control instruction. The visible transmission beam is detected by the receiver of the measuring device and the received part of the transmission beam is evaluated by the control device of the laser measuring device. The control device of the laser measuring device transmits a control instruction to the transmitter of the target object via the communication link, the transmitter switching the visible transmission beam over into the second optical state as a result of the control instruction. The visible transmission beam in the second optical state is detected by the receiver of the laser measuring device and evaluated by the control device of the laser measuring device. The camera unit records a sequence of two-dimensional images of the target object as a result of the control instruction. The images are evaluated by the control device with the aid of known image processing techniques. The control device forms a differential image between the camera image having the transmission beam in the first optical state and the camera image having the transmission beam in the second optical state; the target object may be recognized and identified in the differential image. It is disadvantageous that the laser measuring device and the target object must be connected via a communication link in order to identify the target object. Moreover, the target object must be oriented at least roughly in the direction of the laser measuring device, so that the camera unit of the laser measuring device detects the target object.

SUMMARY OF THE INVENTION

It is an object of the present invention to provide an active target object for a laser measuring device, the target object being unambiguously identifiable for the laser measuring device and also being distinguishable for the user from other target objects. Moreover, the equipment expenditures in the laser measuring device for identifying the target object should be preferably low.

The present invention provides that the transmitter transmits a first and a second visible transmission beam, the light color of the first visible transmission beam being different from the light color of the second visible transmission beam. The use of visible transmission beams has the advantage over infrared transmission beams that undesirable reflections of the search beam from reflective surfaces, such as mirror surfaces, safety vests, traffic signs, and license plates, are not detected. A transmitter which transmits two differently colored visible transmission beams offers the advantage that the target objects may be easily identified in the differential image of a camera unit. Moreover, differently colored visible transmission beams may also be distinguished from one another by the user of a surveying system.

The term "visible transmission beam" is a summary of the following: a single visible laser beam, multiple visible laser beams which are transmitted at the same time, but are spaced apart from one another, and multiple visible laser beams which are transmitted chronologically consecutively. In the case of multiple laser beams, the visible transmission beam is composed of multiple partial beams which are spaced apart from one another or which are transmitted chronologically consecutively.

Preferably, the transmitter transmits at least one further visible transmission beam, the light color of the at least one further visible transmission beam being different from the light color of the first and the second visible transmission beams. The light colors of the visible transmission beams are selected in such a way that the light colors are reliably distinguishable from one another based on their wavelengths.

In one first preferred variant, the transmitter includes a first monochrome beam source, which transmits the first visible transmission beam, a second monochrome beam source, which transmits the second visible transmission beam, and a possible further monochrome beam source, which transmits a possible further visible transmission beam. The use of two or more monochrome beam sources offers the possibility of using several transmission beams for unambiguous identification of the target objects in addition to the light color of a single transmission beam. With the aid of three monochrome beam sources of different light colors, e.g., red, green, and blue, it is possible to identify seven target objects by one measuring device and one user. The target objects use a red, green, or blue transmission beam, a transmission beam formed from two partial beams in red and green, red and blue, or green and blue, or a transmission beam formed from three partial beams in red, green, and blue.

The first and the second beam sources as well as possible further beam sources are particularly preferably designed as monochrome light-emitting diodes. Monochrome light-emitting diodes are cost-effective components. Red, green, and blue light-emitting diodes are cost-effectively commercially available and make possible a simple, cost-effective, and reliable identification of different target objects of a surveying system.

The transmitter preferably includes a first multicolored beam source and a second multicolored beam source, the first and the second beam sources being spaced apart from one another. In this case, the multicolored beam sources are particularly preferably designed as multicolored light-emitting diodes formed from two or three monochrome light-emitting diodes in one housing.

The light colors of the visible transmission beams and/or of the visible partial beams are preferably selected from the light colors red, orange, yellow, green, blue, and violet, particularly preferably from the light colors red, green, and blue. The six light colors red, orange, yellow, green, blue, and violet are reliably distinguishable from one another for the laser measuring device and for the user. The wavelengths of the visible spectrum range between approximately 380 nm and 750 nm. In the visible spectrum, it is differentiated between six different light colors: violet (380 nm through 420 nm), blue (420 nm through 490 nm), green (490 nm through 575 nm), yellow (575 nm through 585 nm), orange (585 nm through 650 nm), and red (650 nm through 750 nm). The light colors red, green, and blue are particularly suitable for the visible transmission beams, since red, green, and blue light-emitting diodes are cost-effectively commercially available.

In one preferred embodiment, a switch is provided for setting the light color of the visible transmission beam. The user uses the switch to set the light color of the visible transmission beam prior to identifying the target objects. A different light color is set at each target object which the user uses.

The present invention also relates to a surveying system including a laser measuring device, which transmits a search beam and a measuring beam, and at least two target objects according to the present invention. The different light colors, in which the visible transmission beams of the target objects are emitted, are used in the surveying system to identify the target objects. A first light color is set at the first target object and a second light color, which is different from the first light color, is set at the second target object.

According to the present invention, the method for identifying a target object with the aid of a laser measuring device, which transmits a search beam, is characterized in that:

in a first step of a control device of the laser measuring device, a control instruction for transmitting the search beam is created by a laser measuring unit, in a second step, the search beam is transmitted by the laser measuring unit to the target object into a spatial area, in a third step, the search beam strikes a receiver element of the target object, in a fourth step, the received search beam is evaluated by the control device of the target object and a control instruction is created by the control device for a transmitter of the target object, and in a fifth step, a visible transmission beam is transmitted by the transmitter of the target object.

Carrying out the identification of a target object with the aid of a visible transmission beam has the advantage that undesirable reflections of the search beam, which is frequently implemented as an infrared laser beam, from reflective surfaces, such as mirror surfaces, safety vests, traffic signs, and license plates, are not detected. Moreover, differently colored visible transmission beams and thus the target objects which transmit the transmission beams may be distinguished from one another by the user of a surveying system.

In one refinement of the method, a control instruction for a camera unit of the laser measuring device for recording images of the spatial area is additionally created in a first step and a sequence of images of the spatial area is recorded by the camera unit as a result of the control instruction. The images of the camera unit are used to create a differential image between an image having a switched-on search beam and an image having a switched-off search beam. In the case of a switched-on search beam, the target object transmits the visible transmission beam which is recognizable in the differential image. The target object is identified by the laser measuring device with the aid of known image processing techniques.

BRIEF DESCRIPTION OF THE DRAWINGS

Exemplary embodiments of the present invention are described in the following with reference to the drawing. The latter is not necessarily supposed to represent the exemplary embodiments true to scale, but the drawing is rather implemented schematically and/or in a slightly distorted form, where it is helpful to the explanation. With regard to the additions of the teachings which are directly apparent from the drawing, reference is made to the pertinent prior art. In this case, it must be noted that various modifications and changes with regard to the form and the detail of a specific embodiment may be carried out without departing from the general idea of the present invention. The features of the present invention described in the description, the drawing as well as the claims may be essential to refining the present invention, both individually and in any arbitrary combination. All combinations of at least two of the features which are described in the description, the drawing and/or the claims are within the scope of the present invention. The general idea of the present invention is not limited to the exact form or detail of the preferred specific embodiment which is shown and described in the following or limited to an object which would be limited in comparison to the object which is claimed in the claims. In the case of provided measurement ranges, values which are within the mentioned limits are also supposed to be provided as limiting values and be arbitrarily usable and claimable. For the sake of simplicity, the same reference numerals are used in the following for identical or similar parts or parts having an identical or a similar function.

DETAILED DESCRIPTION

Figure 1:
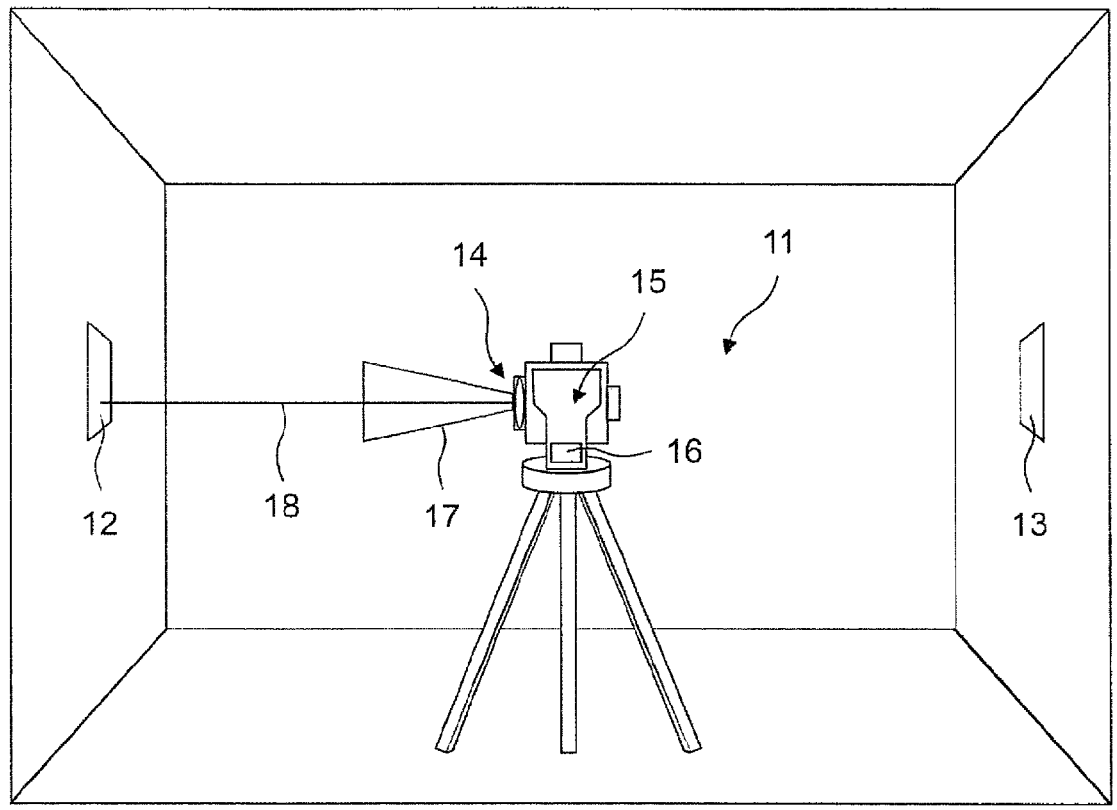
FIG. 1 shows a surveying system including a laser measuring device and two target objects which are identified by the laser measuring device.

FIG. 1 shows in a schematic representation a surveying system 10 including a laser measuring device 11, a first target object 12 according to the present invention, and a second target object 13 according to the present invention. Target objects 12, 13 are situated in a measurement environment, in the example of FIG. 1 at two opposite walls of a room. In addition to being fastened on the walls or ceilings of a room, target objects 12, 13 may be fastened on a tripod or a telescopic pole.

Laser measuring device 11 includes a laser measuring unit 14, a camera unit 15 and a control device 16. Laser measuring unit 14 includes a first and a second beam source, the first beam source transmitting a search beam 17 and the second beam source transmitting a measuring beam 18. Search beam 17 is used to recognize and identify target objects in the measurement environment. In order for search beam 17 not to disturb the users and other people in the measurement environment, the search beam is frequently implemented as an infrared search beam, other wavelengths also being suitable for search beam 17. Measuring beam 18 is, for example, used to measure laser distances and/or angles. In the case of the method for identifying target objects 12, 13, measuring beam 18 is not used. Due to the different tasks of search beam 17 and measuring beam 18, search beam 17 may be strongly expanded for the purpose of detecting a larger spatial area, whereas a focused measuring beam 18 is used for the measuring task.

Figure 2A:
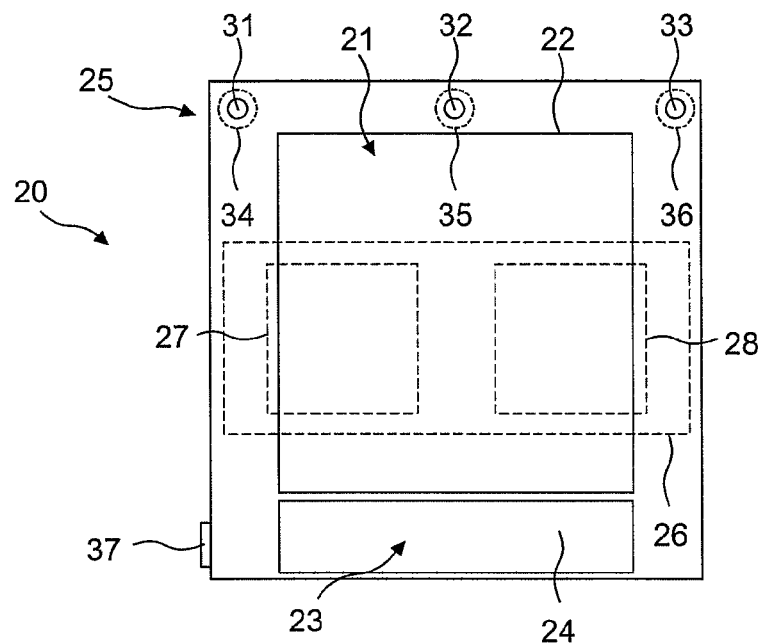
FIGS. 2A, B show a target object according to the present invention in one first embodiment (FIG. 2A) and in one second embodiment (FIG. 2B)

FIG. 2A shows one first specific embodiment of a target object 20 according to the present invention for laser measuring device 11. Target object 20 may be used in surveying system 10 of FIG. 1 as a first or as a second target object 12, 13. In order to distinguish the components of first and second target objects 12, 13 as well as further target objects of surveying system 10 an index "i" is used.

Target object 20 includes a reflector 21 including a reflector element 22 for reflecting measuring beam 18, a receiver 23 including a receiver element 24 for receiving at least a part of search beam 17, a transmitter 25 for transmitting a visible transmission beam, and a control device 26. Control device 26 includes an evaluation element 27 for evaluating received search beam 17 and a control element 28 for controlling transceiver devices 23, 25.

In the exemplary embodiment of FIG. 1, reflector 21 includes a rectangular, planar reflector element 22 for reflecting measuring beam 18. Alternatively, reflector 21 may include multiple reflector elements and the reflector elements may be round, triangular, or have any other suitable shape. In the specific embodiment shown in FIG. 1, transmitter 25 includes three monochrome beam sources 31, 32, 33 which generate three visible transmission beams of different light colors. The first beam source is, for example, designed as a red light-emitting diode 31 and generates a red transmission beam 34 in the wavelength range between approximately 650 nm and 750 nm, the second beam source is designed as a green light-emitting diode 32 and generates a green transmission beam 35 in the wavelength range between approximately 490 nm and 575 nm, and the third beam source is designed as a blue light-emitting diode 33 and generates a blue transmission beam 36 in the wavelength range between approximately 420 nm and 490 nm. Instead of the three monochrome beam sources 31, 32, 33, a multicolored beam source, e.g., a multicolored light-emitting diode having a red, green, and blue light-emitting diode in one housing may be used.

With the aid of red, green, and blue light-emitting diodes 31, 32, 33 of transmitter 25, seven target objects may be identified for laser measuring device 11 and the user. The first target object, for example, transmits a red transmission beam 34, the second target object transmits a green transmission beam 35, and the third target object transmits a blue transmission beam 36. The fourth target object transmits a visible transmission beam which is composed of a red and a green partial beam 34, 35, the fifth target object transmits a transmission beam which is composed of a red and a blue partial beam 34, 36, the sixth target object transmits a transmission beam which is composed of a green and a blue partial beam 35, 36, and the seventh target object transmits a transmission beam which is composed of a red, a green, and a blue partial beam 34, 35, 36. In order to increase the number of identifiable target objects the spatial arrangement of multiple colored partial beams and/or the chronological sequence of multiple colored partial beams may, for example, be used in addition to the light color.

A color sequence for the visible transmission beam may be stored in the target objects. Laser measuring device 11 is able to identify the target objects based on the color sequence. The first target object transmits, for example, a red transmission beam at the first incidence of the search beam, a green transmission beam at the second incidence of the search beam, and a blue transmission beam at the third incidence of the search beam. The second target object transmits, for example, a red transmission beam at the first incidence of the search beam, a green transmission beam at the second incidence of the search beam, and a red transmission beam at the third incidence of the search beam. In order to identify the target objects, laser measuring device 11 switches the search beam on and off multiple times. Camera unit 15 of laser measuring device 11 observes the target object and simultaneously records a sequence of images of the target object.

Target object 20 has a switch 37 for setting the light color of the visible transmission beam. The user sets the light color of target object 20 via switch 37. In a surveying system including multiple target objects, a different light color is set for each target object by the user to be able to distinguish the target objects based on the light color of the visible transmission beam from the other target objects of the surveying system.

Target object 20 requires a power supply for operating receiver 23, transmitter 25, and control device 26. In order to reduce the power consumption, target object 20 has two operating states. During the standby mode, receiver 23 is active. The switchover from the standby mode into the working mode is initiated by search beam 17 of laser measuring device 11. Target object 20 must only be in the working mode when laser measuring device 11 scans the measurement environment using search beam 17. When search beam 17 detects target object 20, a part of search beam 17 strikes receiver element 24 which is connected to control device 26. Control element 28 of control device 26 switches target object 20 into the working mode and activates transmitter 25. After detecting search beam 17 via receiver element 24, target object 20 remains in the working mode for a preset period of time. If during this time, no further search beam 17 strikes receiver element 24, target object 20 is switched over into standby mode. The time during which the target object remains in the working mode may be established or changed by the user via a further switch, for example.

Figure 2B:
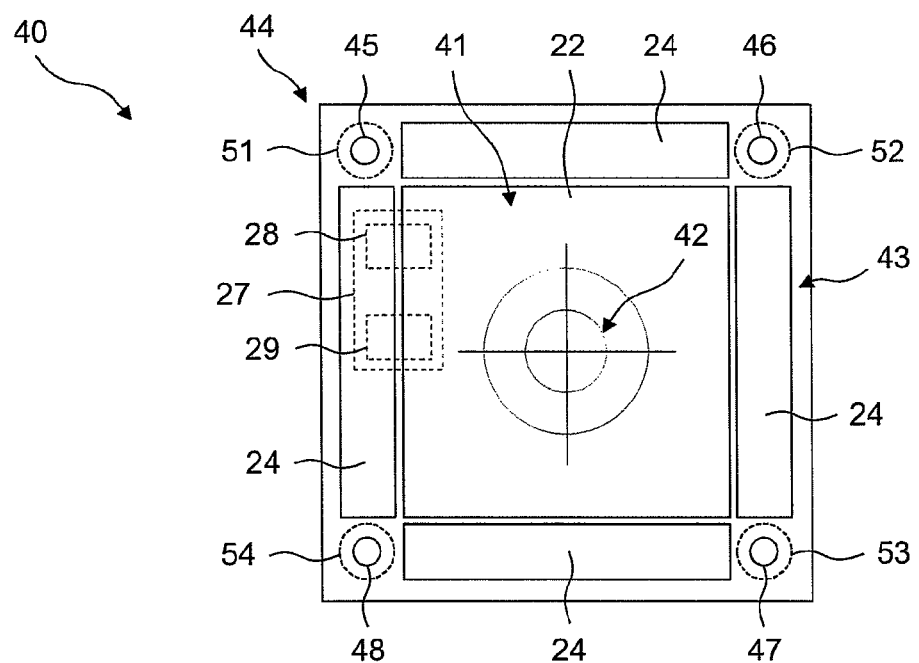

FIG. 2B shows one second specific embodiment of a target object 40 according to the present invention for laser measuring device 11 which transmits search beam 17 and measuring beam 18. Target object 40 includes a reflector 41 including reflector element 22 for reflecting measuring beam 18 and a target element 42 for orienting measuring beam 18, a receiver 43, and a transmitter 44. Receiver 43 includes four receiver elements 24 for receiving search beam 17 which are situated on the four sides of rectangular reflector element 22. Control device 26 including evaluation element 27 and control element 28 is situated on the rear side of target object 40 facing away from reflector element 22.

Transmitter 42 includes four multicolored beam sources 45, 46, 47, 48, which are, for example, designed as multicolored light-emitting diodes in the light colors red, green, and blue. The beam sources are situated in the four corners of rectangular target object 40. First beam source 45 transmits a first visible partial beam 51, second beam source 46 transmits a second visible partial beam 52, third beam source 47 transmits a third visible partial beam 53, and fourth beam source 48 transmits a fourth visible partial beam 54. Each target object transmits an unambiguous transmission beam which is composed of four visible partial beams 51, 52, 53, 54, not every one of the four partial beams being necessarily switched on. With the aid of the four three-colored beam sources 45, 46, 47, 48, it is possible to identify and distinguish from one another $3^4=81$ target objects. The following applies to the number of the target objects in the case of the same beam sources: The number of the colors of a beam source raised to a higher power by the number of the multicolored beam sources.

Figure 3:
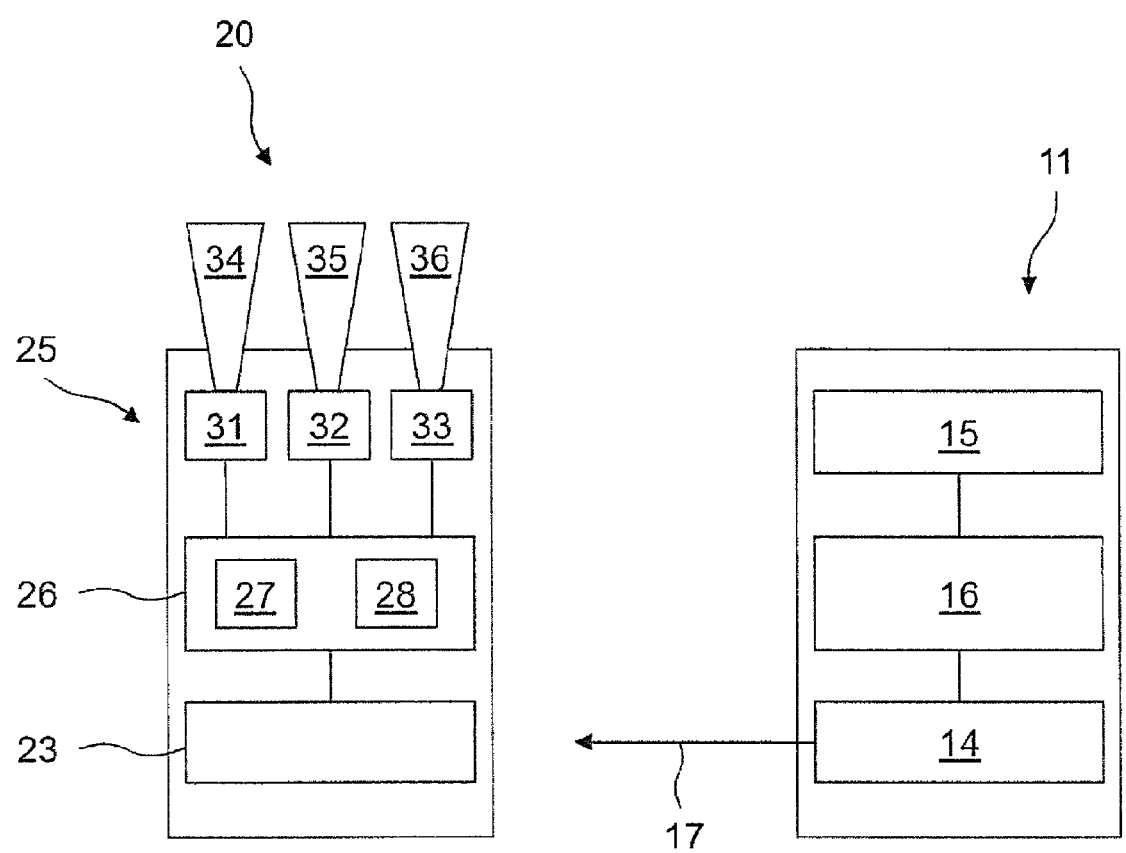
FIG. 3 shows in the form of a block diagram the interaction between the laser measuring device and the target object according to the present invention of FIG. 2A during the identification of the target object.

FIG. 3 shows in the form of a block diagram the interaction between laser measuring device 11 and target object 20 according to the present invention of FIG. 2A during the identification of target object 20. Laser measuring device 11 is designed as a total station including laser measuring unit 14, camera unit 15, and control device 16. Laser measuring unit 14 includes a beam source for transmitting infrared search beam 17.

The method for identifying target object 20 with the aid of laser measuring device 11 includes the following method steps: Control device 16 of laser measuring device 11 transmits a first control instruction to laser measuring unit 14 and camera unit 15. As a result of the first control instruction, the beam source of laser measuring unit 14 transmits a first search beam 17 into a first spatial area and camera unit 15 records a sequence of images of the first spatial area. The images are identified as images having the search beam switched on. Control device 16 of laser measuring device 11 transmits a second control instruction to laser measuring unit 14 and camera unit 15. As a result of the second control instruction, the beam source of laser measuring unit 14 is switched off and camera unit 15 records a sequence of images of the first spatial area. The images are identified as images having the search beam switched off. A differential image is created in control device 16 from the images having the search beam switched on and the images having the search beam switched off. Target object 20 may be recognized and identified in the differential image with the aid of known image processing techniques.

If target object 20 is present in the first spatial area, a part of first search beam 17 strikes at least on receiver element 24 of receiver 23. The received part of search beam 17 is evaluated by evaluation element 27 of target object 20. Control element 28 of target object 20 transmits a control instruction to transmitter 25 which transmits the visible transmission beam as a result of the control instruction. The visible transmission beam is recognizable in the differential image. If no target object is present in the first spatial area, search beam 17 is oriented manually or automatically toward a second spatial area and the method steps of the measuring method are carried out for the second spatial area.

What is claimed is:
1. A surveying system comprising:
  a laser measuring device transmitting an expanded search beam and a focused measuring beam;
  a first target object including:
    a first reflector including at least one first reflector element for reflecting the focused measuring beam;
    a first receiver including at least one first receiver element for receiving the expanded search beam,
    a first transmitter including at least one first transmitter element for transmitting a first visible transmission beam, and
    a first controller including a first evaluator element for evaluating the received expanded search beam and a first controlling element for controlling the first receiver and the first transmitter; and
  a second target object including:
    a second reflector including at least one second reflector element for reflecting the focused measuring beam,
    a second receiver including at least one second receiver element for receiving the expanded search beam,
    a second transmitter including at least one second transmitter element for transmitting a second visible transmission beam, and a second controller including a second evaluator element for evaluating the received expanded search beam and a second controlling element for controlling the second receiver and the second transmitter;

a first light color of the first visible transmission beam being different from a second light color of the second visible transmission beam.

2. The surveying system as recited in claim 1 wherein the first transmitter transmits at least one further visible transmission beam, a further light color of the at least one further visible transmission beam being different from the first and second light colors.

3. The surveying system as recited in claim 1 wherein the first and second transmitter include a first monochrome beam source capable of transmitting a first colored visible transmission beam, a second monochrome beam source capable of transmitting a second colored visible transmission beam, and a third monochrome beam source capable of transmitting a third colored visible transmission beam.

4. The surveying system as recited in claim 3 wherein the first, the second and the third monochrome beam sources of the first and second transmitter are designed as monochrome light-emitting diodes.

5. The surveying system as recited in claim 1 wherein the first and second transmitter include a first multicolored beam source and a second multicolored beam source, the first and the second multicolored beam sources being spaced apart from one another.

6. The surveying system as recited in claim 1 wherein the first and second light colors of the first and second visible transmission beams are selected from the light colors red, orange, yellow, green, blue, and violet.

7. The surveying system as recited in claim 6 wherein the first and second light colors of the first and second visible transmission beams are selected from the light colors red, green, and blue.

8. The surveying system as recited in claim 1 further comprising a switch for setting a color of at least one of the first and second light colors of the first and second visible transmission beams.

9. A method for identifying a target object in a measurement environment with the aid of a laser measuring device including a laser measuring unit transmitting an expanded search beam and a focused measuring beam, a control device and a camera unit, wherein the target object comprises a reflector having at least one reflector element, a receiver having at least one receiver element, a transmitter having at least one transmitter element and a controller having an evaluator element and a controlling element, the method comprising:

transmitting a first control instruction via the control device to the laser measuring unit for switching on the expanded search beam and directing the expanded search beam to a first spatial area of the measuring environment and to the camera unit for recording images of the first spatial area of the measuring environment having the expanded search beam switched on, according to the first control instruction, the expanded search beam is transmitted via the laser measuring unit into the first spatial area of the measuring environment and a sequence of images of the first spatial area of the measuring environment having the expanded search beam switched on is recorded by the camera unit;

transmitting a second control instruction via the control device to the laser measuring unit for switching off the expanded search beam and to the camera unit for recording images of the first spatial area of the measuring environment having the expanded search beam switched off, according to the second control instruction, the expanded search beam is switched off and a sequence of images of the first spatial area of the measuring environment having the expanded search beam switched off is recorded by the camera unit, creating a differential image of the first spatial area of the measuring environment in the control unit from the sequence of images having the expanded search beam switched on and the sequence of images having the expanded search beam switched off, and evaluating the differential image of the first spatial area of the measuring environment in the control unit.

10. The method as recited in claim 9 wherein the target object is identified in the differential image of the first spatial area of the measuring environment in the control unit of the laser measuring unit, if the expanded search beam has stricken on the at least one receiver element of the receiver of the target object.

11. The method as recited in claim 9 wherein the target object is not identified in the differential image of the first spatial area of the measuring environment in the control unit of the laser measuring unit, if the expanded search beam has not stricken on the at least one receiver element of the receiver of the target object.

12. The method as recited in claim 11 wherein the expanded search beam of the laser measuring unit is oriented manually or automatically from the first spatial area of the measuring environment towards a second spatial area of the measuring environment and the method steps of the method carried out for the first spatial area of the measuring environment are carried out for the second spatial area of the measuring environment.

* * * * *